United States Patent
Jou et al.

(10) Patent No.: US 10,360,387 B2
(45) Date of Patent: Jul. 23, 2019

(54) METHOD AND SYSTEM FOR AGGREGATING AND RANKING OF SECURITY EVENT-BASED DATA

(71) Applicant: Interset Software, Inc., Ottawa (CA)

(72) Inventors: Stephan Jou, Richmond Hill (CA); Shaun Pilkington, Ottawa (CA); Michael John Cyze, Kincardine (CA)

(73) Assignee: Interset Software, Inc., Ottawa (CA)

( * ) Notice: Subject to any disclaimer, the term of this patent is extended or adjusted under 35 U.S.C. 154(b) by 241 days.

(21) Appl. No.: 15/160,980

(22) Filed: May 20, 2016

(65) Prior Publication Data

US 2016/0344762 A1 Nov. 24, 2016

Related U.S. Application Data

(60) Provisional application No. 62/165,560, filed on May 22, 2015.

(51) Int. Cl.
*G06F 21/57* (2013.01)
*G06N 7/00* (2006.01)
*H04L 29/06* (2006.01)

(52) U.S. Cl.
CPC .......... *G06F 21/577* (2013.01); *G06N 7/005* (2013.01); *H04L 63/1433* (2013.01); *G06F 2221/034* (2013.01)

(58) Field of Classification Search
CPC . H04L 63/14; H04L 63/1408; H04L 63/1416; H04L 63/1425; H04L 63/1433; G06F 21/00; G06F 21/577; G06F 2221/034; G06N 7/005

See application file for complete search history.

(56) References Cited

U.S. PATENT DOCUMENTS

| | | | |
|---|---|---|---|
| 9,674,210 B1* | 6/2017 | Oprea | ............ H04L 63/1425 |
| 2010/0125911 A1* | 5/2010 | Bhaskaran | ............ G06Q 10/10 726/23 |
| 2018/0025163 A1* | 1/2018 | Bahl | ............ H04L 63/1416 |

* cited by examiner

*Primary Examiner* — Ali S Abyaneh
*Assistant Examiner* — Alexander R Lapian
(74) *Attorney, Agent, or Firm* — DLA Piper LLP (US)

(57) ABSTRACT

The present invention provides a method of identifying aggregating and mathematically ranking security alert data having the steps of identifying a plurality of alerts, selecting a subset of the plurality alerts based on at least one preselected theme, applying a function to the subset of the plurality alerts to compute an aggregate risk score, the function based on at least one factor and prioritizing the aggregate risk score in a risk score list.

9 Claims, 4 Drawing Sheets

METHOD AND SYSTEM FOR AGGREGATING AND RANKING OF SECURITY EVENT-BASED DATA

CROSS-REFERENCE TO RELATED APPLICATIONS

This application claims benefit of priority under 35 U.S.C. § 119(e) of U.S. Ser. No. 62/165,560 filed May 22, 2015, the entire contents of which is incorporated herein by reference in its entirety.

BACKGROUND OF THE INVENTION

1. Field of the Invention

The present invention relates to network security. More specifically, the present invention relates to systems and method for the aggregating and ranking/prioritizing of security event and alert data.

2. Background Information

Current state of the art in Security Incident and Event Management (SIEM) and Data Loss Prevention (DLP) solutions typically involves presenting security practitioners with numerous alerts originating from the myriad systems tasked with collecting event or log data throughout an organization's information technology infrastructure.

These alerts are typically triggered based on whether any given event matches the set of predetermined criteria as specified by the practitioner (or the solution vendor). For example, in situations involving systems that detect anomalies, policy violations, signatures, or classifications, a similar rules-based approach determines whether an observation should be presented as an alert, categorized otherwise, or simply ignored.

Thus, all such systems act as a filter or aggregate, mapping a set of lower level observations onto smaller set of alerts suitable for inspection by human operators. However, despite existing filter and aggregation capabilities, the sheer number of alerts arriving on a daily basis can be overwhelming to analyze and categorize appropriately.

For example, U.S. Pat. No. 7,571,474 describes a system for receiving alerts from multiple security agents, removing duplicates, and sending that to a centralized location. In the system of U.S. Pat. No. 7,571,474 all the aggregated alerts are indistinguishable in severity, and there is no ability to distinguish or quantify between high risk alerts and low risk alerts, and there is no dramatic reduction in the number of alerts from the source agents to the number of alerts in the receiving apparatus.

It is typical for a large organization that processes millions of events daily to result in tens of thousands of alerts daily, an overwhelming amount of information for the human security operators. Specifically, human operators can have difficulty (1) manually processing the large number alerts produced, (2) determining which alerts are valid indicators of a real problem, and (3) determining which alerts should be investigated first. Consequently, important indicators of compromise become lost or overlooked leaving organizations at risk. It is therefore desirable to have an aggregation strategy needs to provide a dramatic, order of magnitude reduction in the volume of alerts (e.g. millions of security events to tens of items to investigate). Further, it is desirable to have a ranking/prioritization applied to the items to investigate, to indicate which items are more probable indicators of true threats, and should be investigated first by human security operators Accordingly, there is need for systems and method for the aggregation and ranking/prioritizing of security event and alert data.

SUMMARY OF THE INVENTION

An object of the present invention is to provide a method and system for aggregating and ranking of security event-based data.

In accordance with an aspect of the present invention there is provided a method of aggregating and ranking security alert data having the steps of identifying a plurality of alerts, selecting a subset of the plurality alerts based on at least one preselected theme, applying a function to the subset of the plurality alerts to compute an aggregate risk score, the function based on at least one factor and prioritizing the aggregate risk score in a risk score list.

In accordance with another aspect of the present invention there is provided a method for aggregating and ranking security alert data, said method comprising: (a) obtaining data set(s) comprising a plurality of alerts from one or more source(s) of data; (b) processing one or more data set(s) for preselected feature(s) to derive data set(s) comprising a selection of alerts having the preselected feature(s); (c) inputting the derived features data set(s) into one or more preselected risk model(s) to obtain an output for each preselected risk model; (d) combining output(s) to form one or stories and determining an aggregate risk score for each story; and (e) ranking said story by said aggregate risk score. The risk models in (c) quantify the security risk associated with the input set of features, and may be calculated in any number of methods, as will be appreciated by security experts. Examples of risk models include anomaly models that output a number in $[0,1]$ that describes how unusual a behavior is, probability models that output a number in $[0,1]$ that predict how probable a set of events and features are to be indicative of a true threat, rules and triggers that classify a pattern into a discrete set of risk levels.

Also provided is a computer program product comprising a computer readable memory storing computer executable instructions thereon that when executed by a computer perform the method of the invention.

Also provided is a system for aggregating and ranking security alert data, said system comprising a processor and a computer readable storage media comprising executable instructions thereon that when executed by said processor perform the method of the invention.

BRIEF DESCRIPTION OF THE DRAWINGS

The present invention will be better understood in connection with the following figures, in which.

DETAILED DESCRIPTION OF THE INVENTION

As noted above, SIEM and DLP solutions typically present security practitioners with numerous security alerts. The sheer number of alerts arriving on a daily basis can be overwhelming to analyze and categorize appropriately. The present invention introduces a higher level construct called a "Story" to aggregate and rank security data and figures.

Accordingly, the present invention provides methods and systems for aggregating and ranking of security event-based data. In at least one embodiment, this "Story" construct works by grouping multiple alerts together in subsets based on one or more common themes and aggregating them into a single score. Exemplary themes include common entities (for example, but not limited to, user, project, machine, file), common time (for example, but not limited to, hour/day buckets), or sets of alerts indicating a common underlying behavior (for example, but not limited to, a user has unusual activity on some machine, and then a privileged user who has accessed the same machine later has unusual activity accessing large amounts of data potentially indicating compromised accounts). Next, at least one function or series of functions can then be used to compute a single aggregate risk score for this grouping taking into account at least one factor including, but not limited to, the type, quantity, and severity of the individual alerts. This maps the subsets of alerts into smaller sets of aggregate alerts that can next be prioritized by score.

Figure 1:
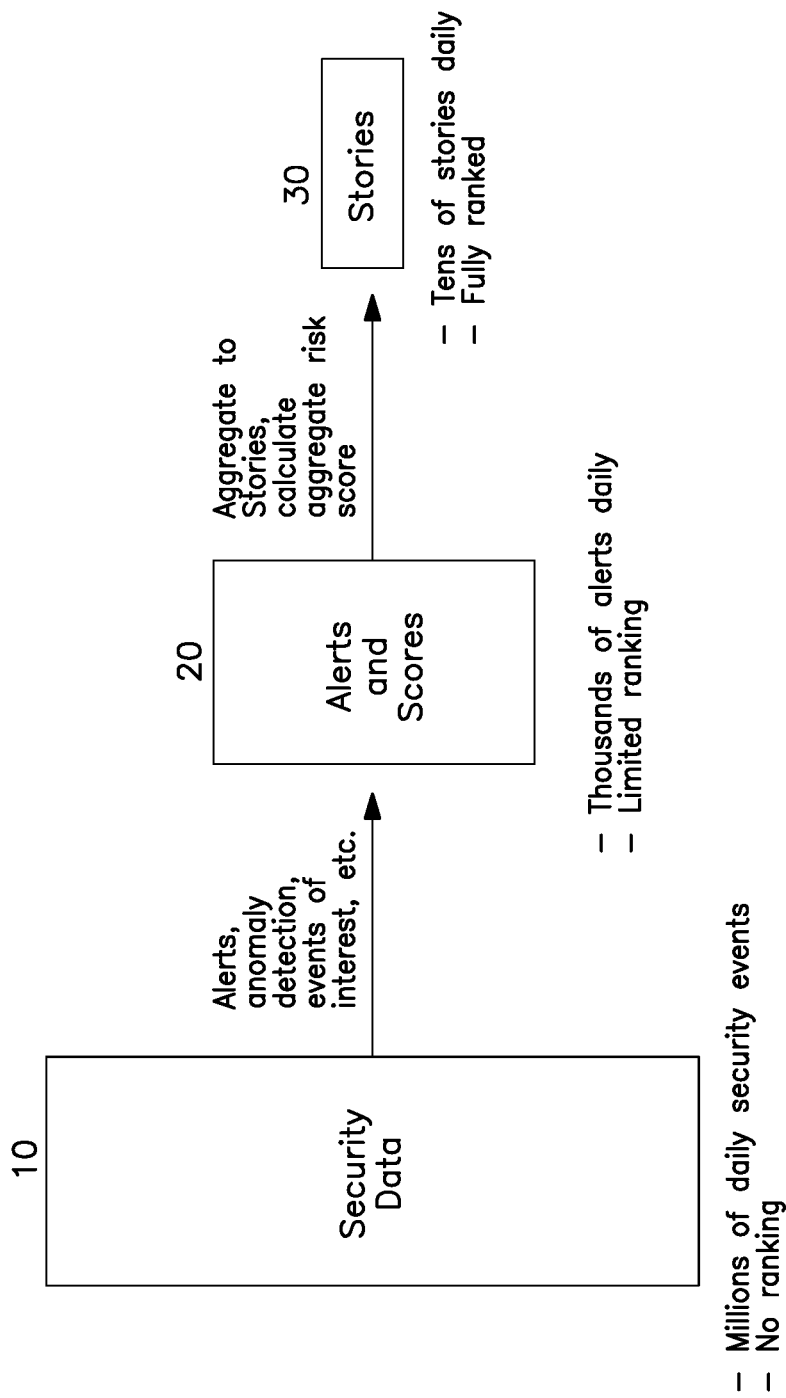
FIG. 1 is a schematic overview outlining the prioritization of millions of unranked security data (10) through thousands of alerts with limited ranking (20) to tens of fully ranked stories (30) using an embodiment of the method of the invention.
Figure 2:
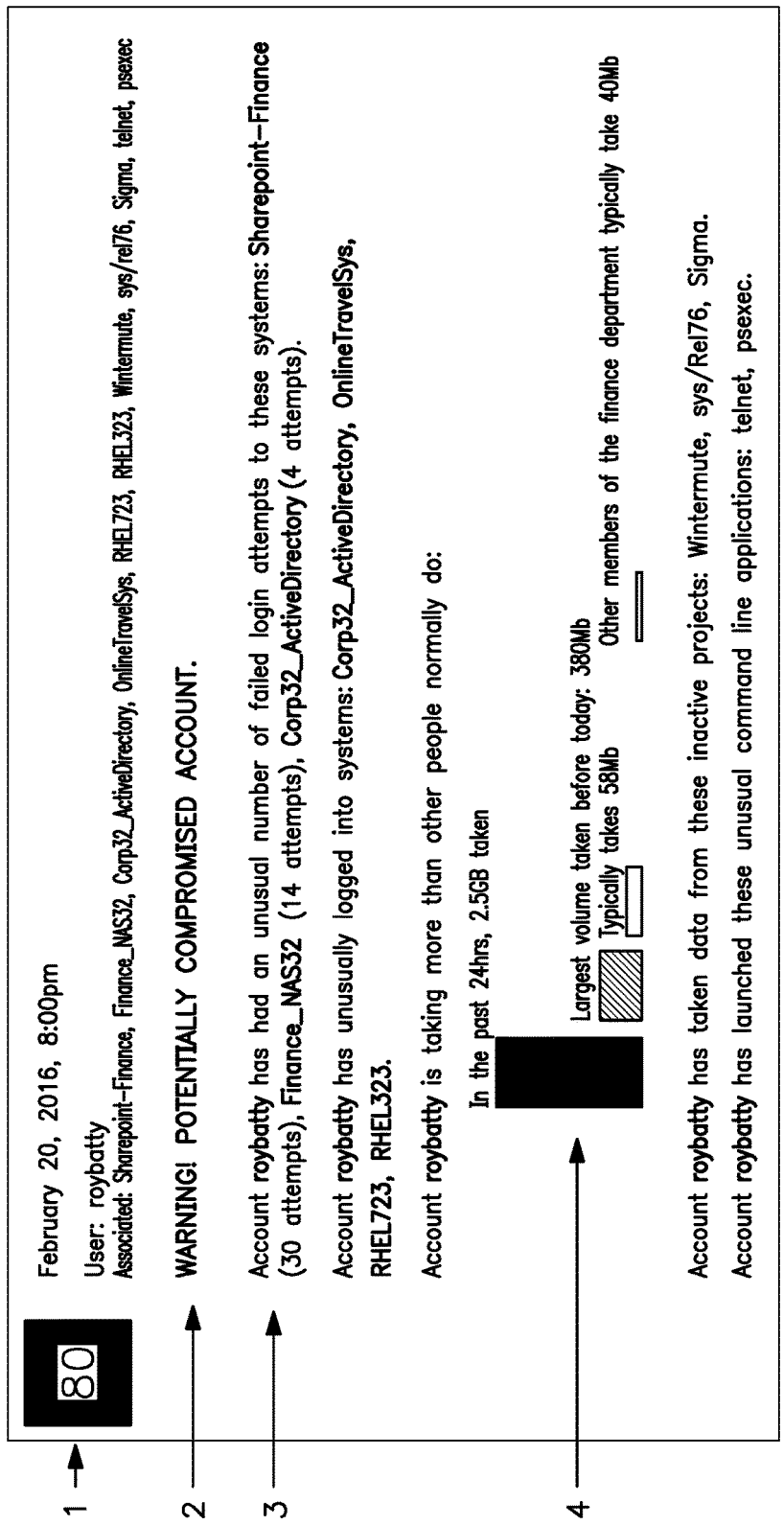
FIG. 2 is an example of an user interface for use in connection with the method of at least one embodiment of the present invention. In this embodiment, the theme of the story is Compromised Account (a "compromised account" is understood by the skilled security expert as when a user's login credentials are being used by an attacker instead of the true user). (1) provides the aggregated score (80% or 0.80), and the story's time (i.e. the time at which the aggregation into stories and ranking was completed) and main characters (including user "roybatty" and systems). (2) provides the Story title or theme. (3) provides five indicators corresponding to one or more anomaly models that have detected a specific behavior that is indicative of a compromised account (i.e. the story's theme). (4) is an illustration of one of the anomaly models.
Figure 3:
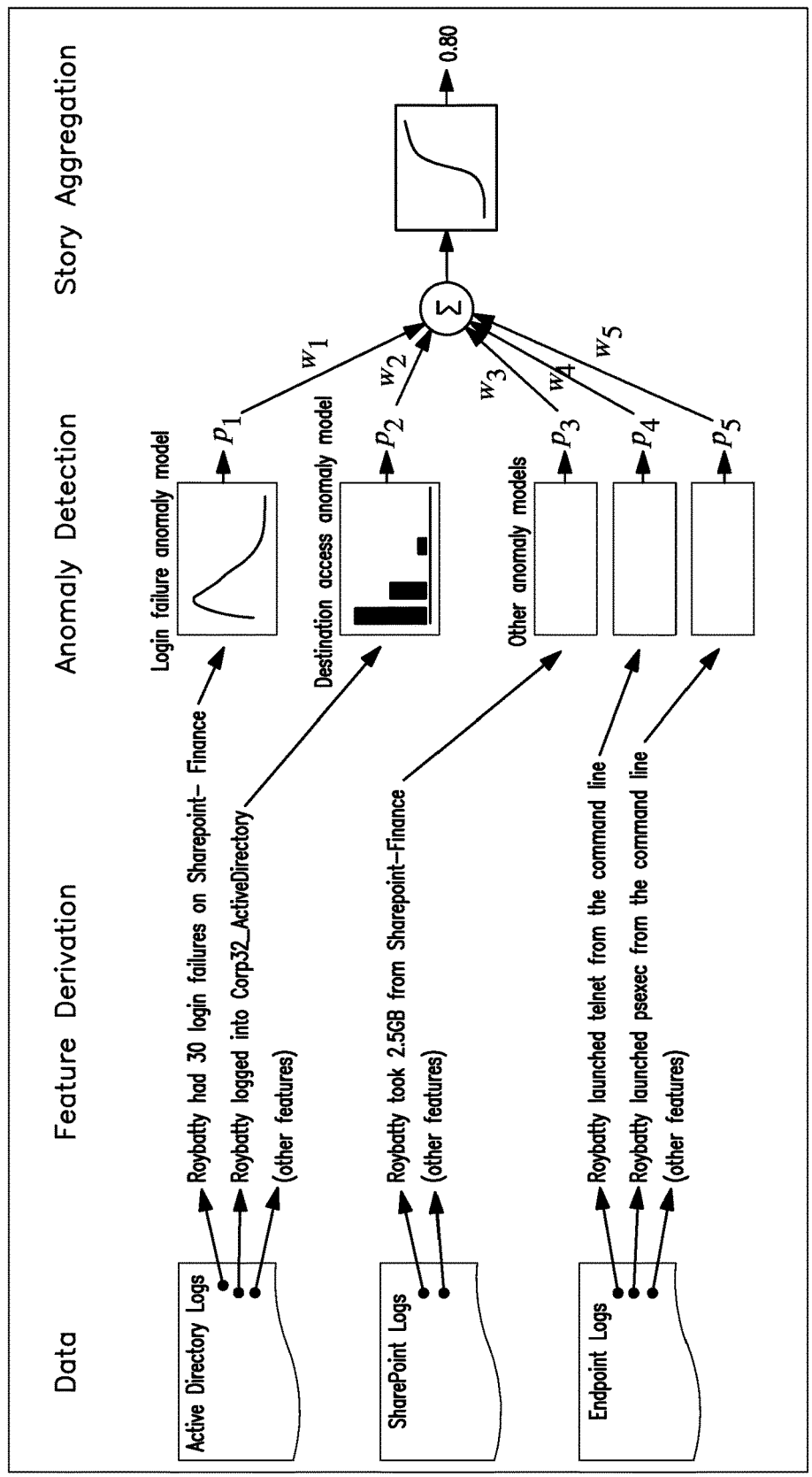
FIG. 3 is a schematic overview of an embodiment of the method that can produce the exemplary results illustrated in FIG. 2. In this example, the data sources are Active Directory, SharePoint and Endpoint logs. These data sources contain raw, low-level information understood by the skilled security expert. Features (or derived values) are derived from this information, and serve as inputs into a set of risk models, in this case anomaly models, that detect and quantify the degree of anomalousness for a set of indicators (in this example, indicators of compromised account activity and include unusual amounts of login failure or unusual destination access). The output of these models are probabilities, $p\_1, p\_2, \ldots, p\_5$ that correspond to the five detected indicators of compromised account activity for this story. These five values ($w1, w2 \ldots, w5$) are aggregated into a weighted sum (□), and then passed through a logistic function to result in an overall, aggregated score for the entire story of 0.80.
Figure 4:
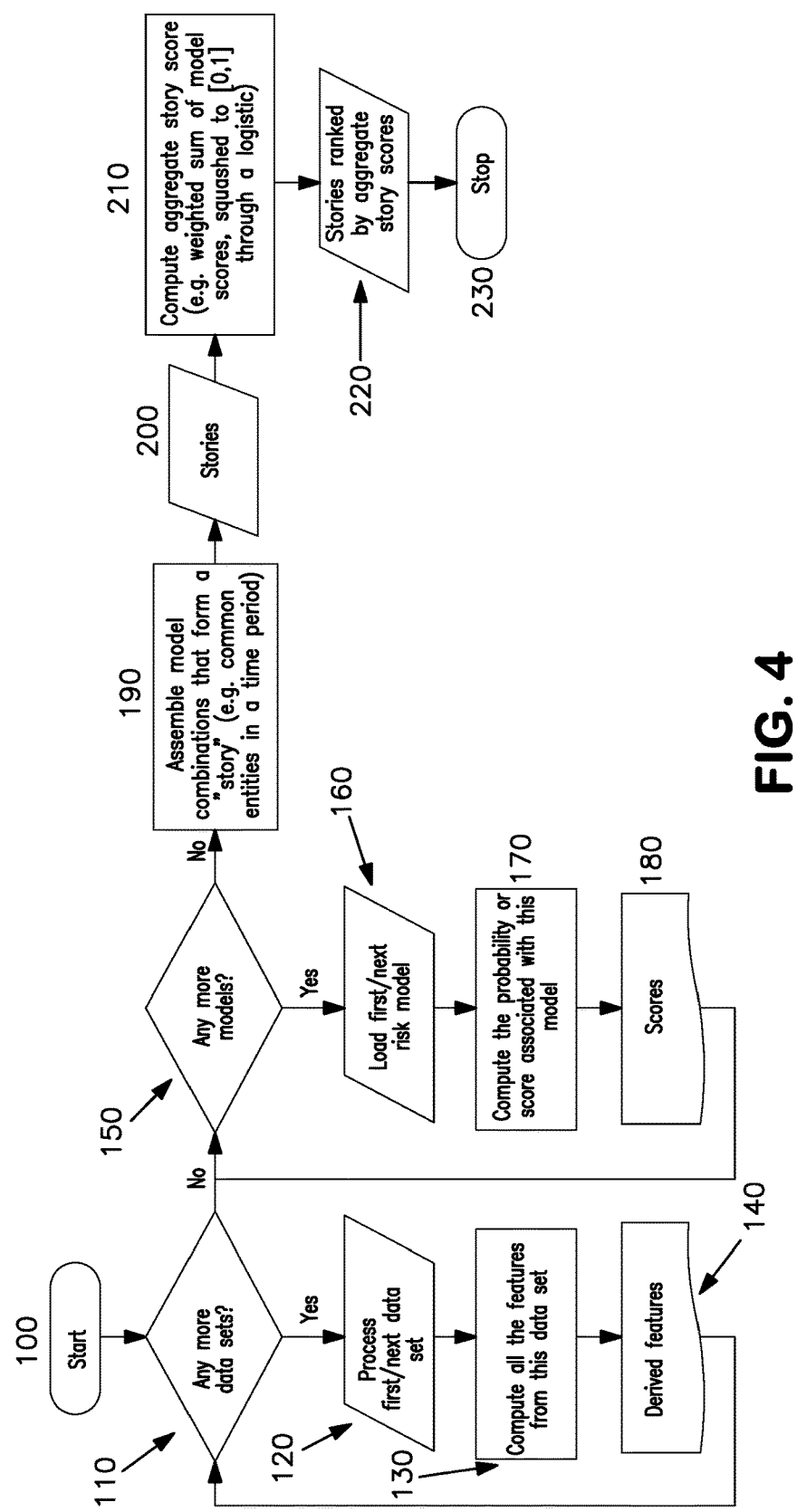
FIG. 4 is a workflow diagram of one embodiment of the method of aggregating and ranking of security event data of the invention. In this embodiment, the method comprises of the following steps: initiation (100) of the method; obtaining (110) a data set from a source of data; processing (120) the source data set by computing (130) features from this data set to derive (140) a data set of alerts having the features related to a pre-selected theme. (110) to (140) are repeated for all the data sets. A risk model (150) is selected and the derived features data set is inputted (160) into the risk model, which may be an anomaly model, a probability model, a rule, or other methods of quantifying risk. The probability (180) or score associated with the anomaly model is computed (170). (150) to (180) are repeated for all risk models. Once a score for each model has been determined, model combinations (190) are assembled to form a "story" (200). The aggregate story score (210) is computed and the stories are ranked/prioritized (230) by the aggregate story score and the method stops (230).

Referring to FIG. 4, in certain embodiments of the present invention there is provided a method for aggregating and ranking/prioritizing security alert data comprising:

Obtaining data set(s) comprising a plurality of alerts from one or more source(s) of data and processing the one or more data set(s) for preselected feature(s) to derive data set(s) comprising a selection of alerts having the preselected feature(s). The preselected features relate to a particular theme(s). For example, the theme of the method of FIGS. 2 and 3 was "compromised account" and the preselected features include for example login failures, logged into unusual systems, increased data downloaded/accessed, data downloaded from inactive projects and unusual command line applications. A worker skilled in the art would readily appreciate that the one or more data sets may be processed simultaneously or consecutively.

The derived data set(s) of preselected features are inputted into one or more risk model(s), including but not limited to anomaly model(s). The risk models relate to the particular theme(s) (for example, the models for FIGS. 2 and 3 relate to the theme of compromised account and include a "login failure anomaly model" and a "destination access anomaly model". A worker skilled in the art would readily appreciate that the one or more risk models may be used simultaneously or consecutively. The output of the models are probabilities that correspond to indicators of the theme(s) (such as, in the case of FIGS. 2 and 3, indicators of a "compromised account"). A worker skilled in the art would readily appreciate that the probability or score associated with each model may be determined simultaneously or consecutively.

Once all the risk models have been completed, model combinations are assembled to form a "story". The aggregate story score is computed and the stories are ranked/prioritized by the aggregate story score.

In at least one specific embodiment, the present system and method is implemented as follows:

First each individual alert is given a score on [0,1]. For binary alerts, this is 1 if the alert is present, 0 if absent. If the alert has a score it is mapped to [0,1]. Next all alerts related to one or more common themes (for example, involving the same person and falling within the same hour bucket) are grouped together. This grouping of alerts will be given a single aggregate score (the Story score) on [0,1] utilizing, for example, an approach similar to logistic regression, among other arrangements that will be readily understood by the skilled person.

As a first step, if there are multiple alerts of the same type within this grouping, they are aggregated into a single score also on [0,1]. In at least one embodiment, this can be simply done by taking the highest scoring alert of each type, though other aggregations exist as will be readily appreciated by the skilled person.

At this point it will be appreciated that there is a single score, $p\_i$, associated with each input alert type. These are combined using a weighted sum, with each alert type having a possibly different weight reflecting its relative importance. As alerts are assumed to only increase the risk, it will be understood that in some embodiments these weights are constrained to be greater than 0.

$$\text{sum} = \sum_i w_i \cdot p_i$$

This weighted sum can then be multiplied by a scaling factor and a sensitivity bias is added. Finally, the resulting value can be put through the logistic function, which gives an aggregated score between 0 and 1, as will readily appreciated by the skilled person.

$$x = \text{scale} \cdot \text{sum} + \text{bias}$$
$$\text{score} = \text{logistic}(x) = \frac{1}{1 + \exp(-x)}$$

It is contemplated that the present method and system may provide advantages over the current state of the art in a number of ways. For example, "Story" risk ranking automatically provides the necessary prioritization, thereby allowing human operators to react to security concerns in the most effective order.

Moreover, it is contemplated in some embodiments that a Story does not simply involve a common theme(s) which affords an effective way to aggregate and compare. Rather, it is further contemplated in some embodiments that Stories can involve a temporal component (which, for example, can be implicit in alerts or anomalies), events/behaviors and entities, which can subsequently be mapped to plotlines, events and characters in corresponding "real-life" stories.

Further, in these embodiments it is contemplated that a user interface can be provided for use in connection with the present methods and systems wherein text and pictures are utilized in order to represent and correspond to plotlines, events and characters in corresponding "real-life" stories.

It further contemplated that a Story can be described and represented in a very easy-to-understand representation, which in at least one embodiment can involve using natural language and visualizations. In a manner analogous to a typical and known book-based story (which can have a title, characters, a plotline, and events that have occurred across a stretch of time) it is contemplated that the use of text and pictures can be used in the security software to represent calculated stories in a very consumable, natural manner. An example of one possible embodiment is given in FIG. 2.

Further, it is contemplated that the present method may result in a reduction of false positives. Assuming a certain implementation, in some embodiments either many alerts or a small number of significant alerts are required to occur simultaneously in order to get a high aggregate score. While it may be common for an individual alert to be triggered by inadvertent or innocuous behavior, on the other hand having multiple different alerts triggered within a theme is much more likely to indicate underlying malicious behavior. This skilled security practitioner will recognize this as an automated method of what would otherwise, in the current state of the art, require laborious and manual creation and tuning of "correlation rules" in a Security Information and Event Management (SIEM) tool.

Finally, the present method may result in a reduction of investigative effort required by the security practitioner. Specifically, rather than deal with millions of daily security events resulting in (for example) thousands of alerts, the aggregation and ranking performed by the present method can result in a much smaller number (for example, tens) of Stories with a high aggregate risk score.

Moreover, it is contemplated that the present method may produce focused points of interest along a coherent Story, allowing human operators to investigate related activities without requiring additional manual correlation efforts.

It is further contemplated that Stories may be used to encompass all manner of alerts which can include, but are not limited to, specific security events, simplistic rule violations, signature pattern matches, classifiers, to sophisticated statistical anomalies, among other alerts which will be readily understood by the skilled person. Furthermore, it is contemplated that the method may work whether the alert already has an associated severity score (such as, continuous or ordinal values) or if it does not (such as, binary or nominal values).

It is contemplated that the presently disclosed methods and systems are agnostic of data source, can handle multiple heterogeneous sources of alerts or data, and the accuracy of risk assessment may improve as the risk of alerts from one data set is corroborated by alerts from another.

Further, it is contemplated that a set of understandable parameters may allow for easy hand tuning, including, but not limited to, a global sensitivity parameter that allows flexibly balancing false-positives and misses. Raising this global sensitivity parameter may result in all of the aggregate scores moving up and saturating at one, which can potentially result in missing less true malicious occurrences, at the expense of increased noise. Similarly, lowering the global sensitivity parameter it decreases the aggregate scores which can potentially decrease the rate of false positives, but accordingly increasing the number of misses. Further, it is contemplated that tuning this parameter also allows the model to handle arbitrarily large or small numbers of alerts depending on the needs of instant application of the present invention.

Further, it is contemplated that individual alert type weights may be used, allowing one to control each alert type's relative influence.

It is contemplated that for many popular loss functions (for example, logistic or squared error) this function yields a simple derivative with respect to each parameter, allowing gradient based tuning of the parameters given labeled feedback as in logistic regression. Feedback can include, but is not limited to, desired values for a set of stories, binary like/dislike of stories, or a desired ordering for stories.

It is also contemplated in some embodiments that the sensitivity and scaling parameters may also be automatically tuned according to some criteria so that the magnitude of alerts becomes manageable.

In some embodiments, if the input alert scores are also differentiable with respect to their parameters, it is contemplated that the chain rule can be used to determine the gradient with respect to these, and the back propagation algorithm allows efficient automated tuning of these.

It is contemplated that in some embodiments, the Story score is a strictly increasing function of the individual risk score. For example, increasing the score of any individual input while keeping the others the same, will always result in an subsequent increase in the Story score.

Further, it is contemplated that having the output bounded makes it more human comprehensible. While it is contemplated that this is (0,1) by default this can be scaled to any convenient bounds (e.g. (0,100)). This bounds is the result of the saturating nonlinearity. For sufficiently small values of inputs, the values can saturate at 0. Similarly, sufficiently large inputs can cause the bounds to saturate at 1. Thus, below a certain level of input evidence, it is contemplated that the output is effectively 0 and the event is too small to warrant attention. Similarly, it is contemplated that for a sufficiently severe assortment of alerts, it is already clearly worthy of human attention, having a score close to 1, and any increase in severity does not appreciably change the result.

It is contemplated that the actual form of this aggregation is general and does not limit itself to solely traditional alerts as inputs. Other example of suitable inputs could include, but are not limited to, an entity's historical risk trend, a configurable user risk parameter, or file value, among other arrangements of alerts as will be readily appreciated by the skilled person. It is contemplated that such inputs can be included in the weighted sum with their own weights, or as a multiplier on the weighted sum. Any such suitable arrangement would allow these values effects to have associated parameters, which could be tuned using the same automated procedure.

Further, it is contemplated that in some embodiments the logistic model can be stacked hierarchically, where one group of alerts yields a Story which can be treated as one of many alerts that are grouped into a higher Story. These can be tuned individually, or all at once using, for example, chain rule/backpropagation, among other arrangements that will be readily appreciated by the skilled person.

Although the invention has been described with reference to the above examples, it will be understood that modifications and variations are encompassed within the spirit and scope of the invention. Accordingly, the invention is limited only by the following claims.

What is claimed is:

1. A method for aggregating and ranking security alert data, said method comprising:
    (a) obtaining data set(s) comprising a plurality of alerts from one or more source(s) of data;
    (b) processing one or more data set(s) for preselected feature(s) to derive data set(s) comprising a selection of alerts having the preselected feature(s);
    (c) inputting the derived features data set(s) into one or more preselected risk model(s) relating to one or more themes to obtain an output for each preselected risk model, wherein said one or more risk model(s) is selected from anomaly models, probability models, rules and combinations thereof, wherein said output for each preselected risk model is a probability or score that correspond to indicators of the one or more themes;
    (d) combining output(s) based on one or more common themes and a temporal component to form one or more stories and determining an aggregate risk score for each of said one or more stories, wherein said one or more themes are selected from a group consisting of common entities and common events/underlying behaviors; and
    (e) ranking each of said one or more stories by said aggregate risk score.

2. The method of claim 1, wherein said one or more risk model(s) are one or more anomaly model(s).

3. The method of claim 1, wherein each of said one or more stories are represented using natural language.

4. The method of claim 1, wherein each of said one or more stories are represented using visualizations.

5. The method of claim 1, wherein each of said one or more stories are represented using natural language and visualizations.

6. A computer program product comprising a non-transitory computer readable memory storing computer executable instructions thereon that when executed by a computer perform a method for aggregating and ranking security alert data, said method comprising:
    (a) obtaining data set(s) comprising a plurality of alerts from one or more source(s) of data;
    (b) processing one or more data set(s) for preselected feature(s) to derive data set(s) comprising a selection of alerts having the preselected feature(s);
    (c) inputting the derived features data set(s) into one or more preselected risk model(s) relating to one or more themes to obtain an output for each preselected risk model, wherein said one or more risk model(s) is selected from anomaly models, probability models, rules and combinations thereof, wherein said output for each preselected risk model is a probability or score that correspond to indicators of the one or more themes;
    (d) combining output(s) based on one or more common themes and a temporal component to form one or more stories and determining an aggregate risk score for each of said one or more stories, wherein said one or more themes are selected from a group consisting of common entities and common events/underlying behaviors; and
    (e) ranking each of said one or more stories by said aggregate risk score.

7. The computer program product of claim 6, wherein said one or more risk model(s) are one or more anomaly model(s).

8. A system for aggregating and ranking security alert data, said system comprising: a processor and a non-transitory computer readable storage media comprising executable instructions thereon that when executed by said processor perform a method for aggregating and ranking security alert data, said method comprising:
    (a) obtaining data set(s) comprising a plurality of alerts from one or more source(s) of data;
    (b) processing one or more data set(s) for preselected feature(s) to derive data set(s) comprising a selection of alerts having the preselected feature(s);
    (c) inputting the derived features data set(s) into one or more preselected risk model(s) relating to one or more themes to obtain an output for each preselected risk model, wherein said one or more risk model(s) is selected from anomaly models, probability models, rules and combinations thereof, wherein said output for each preselected risk model is a probability or score that correspond to indicators of the one or more themes;
    (d) combining output(s) based on one or more common themes and a temporal component to form one or more stories and determining an aggregate risk score for each of said one or more stories, wherein said one or more themes are selected from a group consisting of common entities and common events/underlying behaviors; and
    (e) ranking each of said one or more stories by said aggregate risk score.

9. The system of claim 8, wherein said one or more risk model(s) are one or more anomaly model(s).

* * * * *